3,694,271
METHOD OF PRODUCING ARTICLES OF COMPOSITE MATERIAL, AND RESULTING PRODUCTS
Lennart Oskar Egnell, Sandviken, Sweden, assignor to Sandvikens Jernverks Aktiebolag, Sandviken, Sweden
Filed June 11, 1971, Ser. No. 152,156
Claims priority, application Sweden, June 30, 1970, 9,045/70
Int. Cl. C21d 7/00, 1/00
U.S. Cl. 148—12
10 Claims

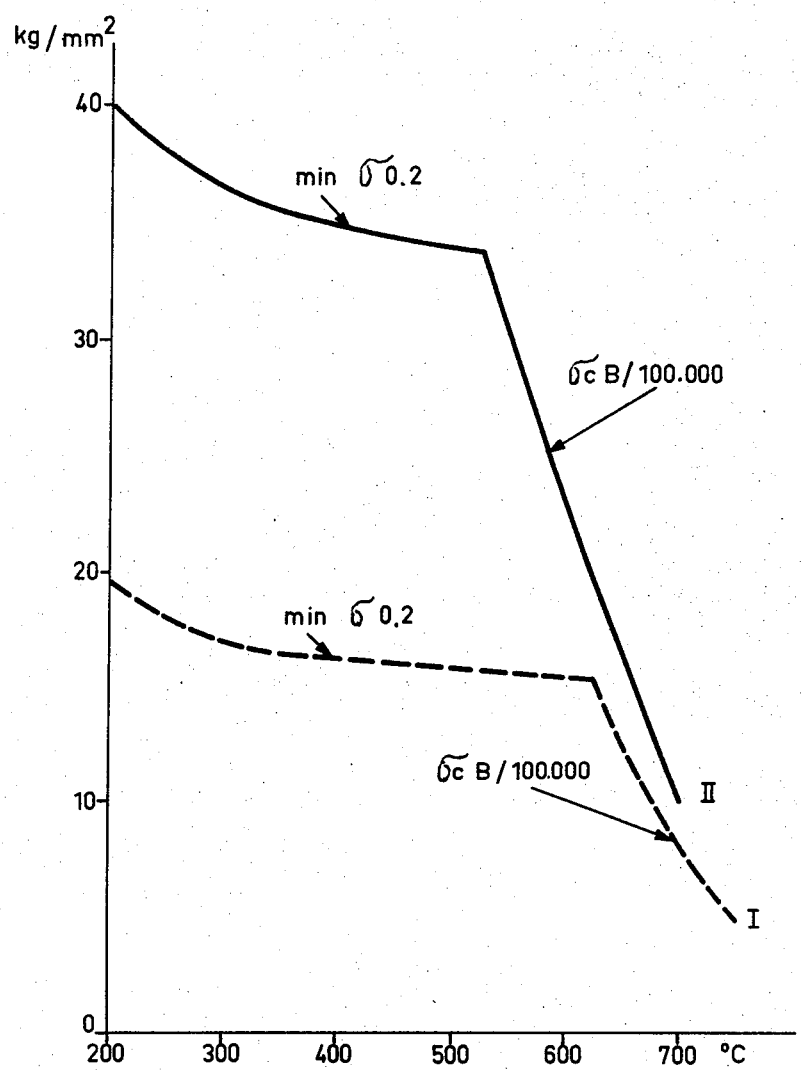

ABSTRACT OF THE DISCLOSURE

A duplex metal article, for high-temperature use, consisting of a high-strength austenitic stainless steel and a layer of ferritic stainless steel having high resistance to stress corrosion is produced by the steps of forming a composite billet of the two metals, heat-treating the billet in the way normal for austenitic steel, cold-working the billet, and heat-treating the resulting article at such a temperature that only the ferritic steel is re-crystallized.

---

The present invention relates to a method of producing duplex metal articles (i.e., articles of composite materials) for use at high temperatures and consisting of, a supporting intermediate layer of austenitic stainless steel which on at least one and usually on both sides is covered with outer layers of ferritic stainless steel having high resistance to stress corrosion. The invention also includes objects such as tubing, strip and plate manufactured according to the method.

Austenitic stainless steels have good general resistance to corrosion and, as a rule, at higher temperatures also high creep strength. At temperatures above about 100° C., the fitness for use of these steels is restricted, however, because of the susceptibility to halogen-induced stress corrosion. In steam generators and superheaters, for example, there is a certain enrichment of chlorides on the tube surfaces where water evaporation occurs. In tubes of austenitic steel the consequence will be stress corrosion attack. Accordingly, a careful water control is a pre-requisite for the use of austenitic stainless steel in such cases. In spite of these measures, the risks of developing such stress corrosion has to be regarded as considerable, particularly in the temperature range of 300–550° C.

A solution of the above-mentioned problem would involve manufacturing of a composite material consisting of a supporting layer of austenitic stainless steel which on one or both sides is supplied with outer layers of ferritic stainless steel having high resistance to stress corrosion. For example a tube, manufactured of such composite material having the ferritic layer along the interior surface, should in that may be protected against stress corrosion at the mentioned surface.

It has been found, however, that the desired favorable properties in articles of the above-mentioned composite material cannot be obtained except when observing a special method of manufacture adapted to the metallic properties of the two materials.

Only by the invention has it been possible to make objects of such composite material with desired favorable properties in the mentioned (and other) respects, including a considerably increased strength of the austenitic component at elevated temperatures and a favorable fine grained structure of the ferritic component.

The supporting layer of austenitic stainless steel in the composite material is preferably chosen among the high temperature steels with high creep strength, and should contain at the lowest 14% chromium and at the lowest 8% nickel; the layer (or the layers) of ferritic stainless steel, on the other hand, consists of a steel—resistant to halogen induced stress corrosion—having a chromium content below 14%. As examples of material combinations may be mentioned a supporting layer of an austenitic steel of the type containing about 18% Cr, 12% Ni and 2.5% Mo, combined with a layer of a ferritic steel containing about 13% Cr. A similar combination is a supporting layer of an austenitic steel containing about 15% Cr, 15% Ni, 1.2% Mo and 0.4% Ti, combined with a covering layer or layers of a ferritic steel containing about 12% Cr, 1% Al and 0.4% Ti.

It is often suitable to choose such a composition of the ferritic steel that it shall not become hardened in connection with welding and also not be embrittled after long time use because of so-called "475° C.-embrittlement." In the last-mentioned respect, additions of Al up to 3%—for instance, between 0.5–2%—have been found to prevent 475° C.-embrittlement.

Another critical condition precedent for the use of the composite material at high temperatures is that contact between the components (i.e., layers) shall not be lost. This makes necessary a metallurgical bond, attained by some kind of hot working, for instance, rolling or extrusion.

The present invention principally relates to a method of manufacturing articles of the above-described composite material in which method the finishing, working- and heat-treating operations have been adjusted so that the desired, favorable properties are attained in the austenitic component as well as in the ferritic component.

One of the conditions precedent is that the austenitic stainless steel shall be the strength supporting component and that the chosen heat-treatment conditions shall give optimum strength. The normally occurring heat-treatment is quenching from a temperature above 1000° C., for instance 1050° C. For certain austenitic steels the quenching is done from temperatures above 1050° C. in order to give high creep strength.

If the quenching is performed from above-mentioned temperatures the layer of ferritic stainless steel—which should be thinner than the layer of strength-supporting austenitic steel—will acquire a coarse structure, which is characterized by large grains. Such a structure has low ductility, which characteristic has been found to be very unfavorable.

Because the thermal expansion properties of the respective materials are very different—the ferritic material expands much more than does the austenitic—the thinner ferritic layer is exposed to strain fatigue at normally present temperature variations during operation conditions causing crack-formation in case of a coarse structure. The tendency to cracking is dependent on the structure and will begin earlier the coarser is the structure. It is, therefore, essential to produce a fine-grained structure in the ferritic material. This also causes the material to have improved corrosion-resistance properties.

A more fine grained, more ductile, structure in the ferritic steel—and, at the same time, an essentially improved strength in the austenitic steel—are attained according to the invention by cold working a billet of the composite material, after quenching from normal temperature for austenitic steels, and then heat-treating at such a temperature that only the ferritic steel recrystallizes.

After the quenching, which is usually done from a temperature above 1000° C., for instance between 1030–1230° C., but before the cold-working, the austenitic steel has good creep strength at the same time as the yield strength is relatively low, while the layer of ferritic steel has acquired the mentioned unfavorable coarse structure. In the cold-working the cross-sectional area of the billet of the composite material shall be reduced between 5–

70%, preferably between 5–45%. By this operation the yield strength of the austenitic steel is raised very much even at low reductions, at the same time as its creep strength, also is increased. For the ferritic steel, particularly if it is all ferritic, containing for instance titanium, aluminum, niobium and/or tantalum, the ensuing cold-rolling makes a recrystallization possible at the following heat-treatment, which heat-treatment is performed as an annealing at a temperature between 650–950° C., preferably between 700–850° C. By this heat-treatment the ferritic steel acquires the desired favorable fine-grained structure whilst the risk of intergranular corrosion after, for instance, welding is decreased; at the same time, the austenitic steel only undergoes a recovery, meaning that the internal stresses in it are somewhat reduced.

The method according to the invention leads to a recrystallized fine-grained structure in the ferritic component as well as very high strength in the austenitic component mainly because of the great increase in yield strength.

It may be mentioned that the cold-working in the manufacture of tubes of the composite material is preferably done by drawing, rolling and/or bending, at which the bending may be performed in connection with the tube manufacturing or with the production of heat exchangers or the like articles.

It may be mentioned further, that the coarse structure of the ferritic steel after the quenching shows grains with a mean grain area in the order of $2000\mu^2$ (square microns). The mean grain area of the fine-grained structure of the steel after the recrystallization annealing may for instance be between $300-600\mu^2$.

The advantages which are obtained by the described method and the conditions precedent for its accomplishment will be fore specifically described in the following, taken in connection with the showing in the appended drawing, in which the single figure is a diagrammatic showing of strength improvements realized by following the concepts of the present invention.

A composite material consisted of a supporting layer of an austenitic steel of the type AISI 321 (SIS 2337) containing 0.07% C; 0.6% Si; 1.5% Mn; 17.5% Cr; 10.5% Ni; 0.4% Ti and the rest mainly iron, provided with a surface layer of a steel resistant to stress corrosion, said layer consisting of a ferritic 13 percent chromium steel with the composition: 0.04% C; 0.3% Si; 0.3% Mn; 13% Cr and the rest mainly iron. After quenching from about 1060° C. the composite material showed quite normal properties concerning the austenitic component while the ferritic component had acquired a coarse structure with a mean grain area equivalent to about $2000\mu^2$. The quenching was followed by a cold-working procedure in which the cross-sectional area of the material was reduced 10%.

By means of the cold-working the yield strength of the austenitic steel was substantially increased. Finally, the material was annealed at a temperature between 700–800° C. By this expedient the ferritic steel recrystallized and acquired a fine-grained structure with a mean grain area of about $500\mu^2$, while the austenitic steel maintained the increased strength attained by the cold-working without recrystallizing. For a composite material with the mentioned components and an annealing temperature between 700–800° C. it has been found necessary that the reduction must not exceed 30% if the effect according to the invention should be obtained. The reason therefore is that the recrystallization temperature of the austenitic component decreases at increasing degree of cold-working.

If the composite material is chosen from a high temperature strength austenitic steel of the type 0.10% C; 0.4% Si; 1.8% Mn; 15% Cr; 15% Ni; 1.2% Mo; 0.45% Ti; 0.006% B and the rest mainly iron, with a surface layer resistant to stress corrosion in a 13 percent ferritic chromium steel, for example of the earlier mentioned kind or in a ferritic chromium steel of the type 0.06% C; 0.3% Si; 0.3% Mn; 12% Cr; 0.45% Ti; 1.0% Al and the rest mainly iron, the conditions precedent for the method will be changed in comparison with the preceding case because the high creep strength austenitic steel has a considerably higher recrystallization temperature than has the austenitic steel of the type AISI 321 (SIS 2337). After quenching at 1100° C. and 30% reduction of the cross-sectional area by means of cold-working, the recrystallization temperature of the austenitic component is about 850° C. At higher degrees of reduction the recrystallization temperature of this component gradually decreases. Thus if the recrystallization annealing of the ferritic component is performed at 700° C., the reduction of the cross-sectional area of the mentioned composite material by cold-working must not exceed about 60% if the recrystallization of the austenitic component shall be avoided. The use of high creep strength austenitic steel thus ensures greater margins concerning the degree of cold-working and the recrystallization temperature in the accomplishment of the method according to the invention. An additional improvement in the mentioned respect can be obtained by increasing the quench annealing temperature. If this is increased from 1100° to 1150° C., a corresponding rise in the recrystallization temperature of the mentioned high-creep strength austenitic steel occurs at the same time.

The diagram of the appended drawing shows the improve strength which the mentioned high-creep strength austenitic steel acquires by means of the procedure according to the invention. The curves in the diagram illustrate the minimum yield point (min. $\sigma 0.2$) respectively the creep rupture strength at 100.000 hours ($\sigma cB/100.00$) for the steels at temperatures between 200 and 700° C.

From curve 1 the result after merely quenching from 1150° C. is evident, whilst from curve 2 the result after quenching from 1150° C. followed by a 20% reduction of the cross-sectional area by means of cold-working and recovery annealing about 1 hour at 800° C. The annealing temperature and time were adjusted to the recrystallization of the ferritic steel in the composite material.

The yield strength and the creep rupture strength represent the normally used data for design calculations, the yield strength at temperatures below the intersection of the respective strength values and the creep rupture strength above the mentioned point of intersection. From the curves in the diagram it is evident that the yield strength as well as the creep rupture strength, is increased by practicing the described procedure, the first one about 100%. This means a considerably increased possibility to use the austenitic steels as a strength-supporting component in a composite material in particular in the earlier-mentioned temperature range of 300–550° C.

In the manufacture of composite material according to the invention it is, as mentioned earlier, often suitable to choose austenitic stainless steels of the high-temperature strength type. As an example of this kind of steel the following analysis may be mentioned: 0.03–0.20% C; up to 1% Si; 0.2–3% Mn; 14–20% Cr; 12.5–35% Ni; 0.3–0.8% Ti; 0.2–1.7% Mo; 0.002–0.020% B; up to 0.5% V, W, Nb and/or Ta; up to 1% Co; at the most 0.5% Cu; up to 0.2% Ce and/or Zr and the rest iron with insignificant amounts of impurities.

The ferritic stainless steel may—except iron with insignificant amounts of impurities—contain: 0.03–0.10% C; for instance 0.06% C; 10–14% Cr; up to 1% Si; up to 1% Mn; up to 1% Ti—for instance, 0.3–0.6% Ti; up to 1.5% Ta and/or Nb, for instance 0.6–1.2% Ta and/or Nb; and up to 3% Al, for instance 0.5–1.5% Al.

In the following, some examples are mentioned concerning the manufacture of composite tubes by application of the procedure according to the invention.

EXAMPLE 1

In the manufacture of tubes for steam generators and superheaters there were used composite tube billets composed of austenitic stainless steel standard steel AISI 316 (SIS 2343) and a ferritic stainless 13 percent chromium steel, possibly containing additions of further alloying elements as Al, Ti, Nb and/or Ta. The billet was hot-extruded and cold-rolled to tubes with an outer diameter of 27 mm. and a wall thicknes of 3.5 mm., of which 3 mm. was the layer of austenitic steel and 0.5 mm. was the layer of ferritic steel. The cold-rolling was followed by solution heat-treatment at 1060° C. and fast cooling. Then the wall thickness was reduced 10% by cold-working. Finally, the article was annealed at 750° C. by which treatment the ferritic layer obtained by recrystallization a fine-grained structure with a mean grain area of about $400\mu^2$, while no recrystallization occurred in the austenitic layer, which latter maintained the high yield strength and creep strength obtained through the cold-rolling.

EXAMPLE 2

The manufacturing was performed according to Example 1 with the difference that the tubes, after the 10 percent reduction by cold-working, were cold-bent the U-bends, after which the total reduction in the bends were at the most 25%.

EXAMPLE 3

Composite tubes for the purpose mentioned in Example 1 were made of a composite material consisting of high-temperature strength austenitic steel with the composition: 0.10% C; 0.4% Si; 1.8% Mn; 15% Cr; 15% Ni; 1.2% Mo; 0.45% Ti; 0.006% B and the rest iron, and a ferritic chromium steel with the composition: 0.06% C; 0.3% Mn; 12% Cr; 0.45% Ti; 1.0% Al and the rest iron. After hot-extrusion and cold-rolling, quenching from 1150° C. was effected. Then the tubes were cold-worked along their whole length by drawing, by which measure the cross-sectional area was reduced about 10%, and finally there was an annealing for 1 hour at a temperature between 750–800° C. By this treatment the layer of austenitic material acquired a yield strength ($\sigma 0.2$) at 500° C. of 40 kg./mm.$^2$. The ferritic material recrystallized completely and acquired a mean grain size of about $500u^2$.

EXAMPLE 4

Composite tubes with a composition according to any of the Examples 1 and 3 were cold-worked (after quenching) along their whole length by drawing and by bending in connection with the manufacture of heat exchangers or similar articles in which the tubes were supposed to be used. The total deformation was at least 10%. The final annealing occurred (as before) at a temperature between 750–800° C.

I claim:

1. Method of making a tube, strip or plate article of composite material for use at high temperatures and consisting of a supporting layer of austenitic stainless steel which on at least one side is bonded to an outer layer of ferritic stainless steel having high resistance to stress corrosion, said method comprising the steps of forming a composite billet of said austenitic and ferritic stainless steels; heat-treating the billet of composite material in a normal way for austenitic steel, said heat-treatment including solution heat treatment followed by fast cooling, cold-working and finally heat-treating the resulting article at such a temperature that only the ferritic steel is recrystallized.

2. Method according to claim 1, wherein the final heat treatment for the recrystallization of the ferritic steel is performed by annealing at a temperature between 650–950° C.

3. Method according to claim 1, wherein the final heat treatment for the recrystallization of the ferritic steel is performed by annealing at a temperature between 700–850° C.

4. Method according to claim 1, in which the solution heat-treatment is effected at a temperature above 1000° C.

5. Method according to claim 1, in which the cross-sectional area is reduced by an amount between 5–70% in the cold working.

6. Method according to claim 1, in which the cross-sectional area is reduced by an amount between 5–45% in the cold working.

7. Method according to claim 1, wherein the austenitic steel is a high-temperature steel containing at the least 14% chromium and at the lowest 8% nickel, whilst the ferritic steel is resistant to halogen-induced stress corrosion and has a chromium content of less than 14%.

8. Method according to claim 1, wherein the austenitic steel consists of 0.03–0.20% carbon; at the most 1% silicon; 0.2–3% manganese; 14–20% chromium; 12.5–35% nickel; 0.3–0.8% titanium; 0.2–1.7% molybdenum; 0.002–0.020% boron; at the most 0.5% vanadium, tungsten, niobium and/or tantalum; at the most 1% cobalt; at the most 0.5% copper and at the most 0.2% each of cerium and/or zirconium, balance iron and insignificant amounts of impurities, which austenitic steel is firmly bonded to a layer of ferritic steel.

9. Method according to claim 1, in which the ferritic steel contains 10–14% chromium, up to 3% aluminum, up to 1% titanium and up to 1.5% niobium and/or tantalum.

10. Method according to claim 1, in which the initial billet of the composite material is formed by hot-working as extrusion or rolling.

References Cited

UNITED STATES PATENTS

| | | | |
|---|---|---|---|
| 2,306,421 | 12/1942 | Arness | 29—196.6 X |
| 2,759,249 | 8/1956 | Eberle | 29—196.1 |
| 2,764,805 | 10/1956 | Mears | 29—196.1 |
| 2,769,227 | 11/1956 | Sykes et al. | 29—196.6 X |
| 3,323,953 | 6/1967 | Lesney | 148—12 X |

CHARLES N. LOVELL, Primary Examiner

U.S. Cl. X.R.

29—196.1, 196.6; 148—34, 127